UNITED STATES PATENT OFFICE.

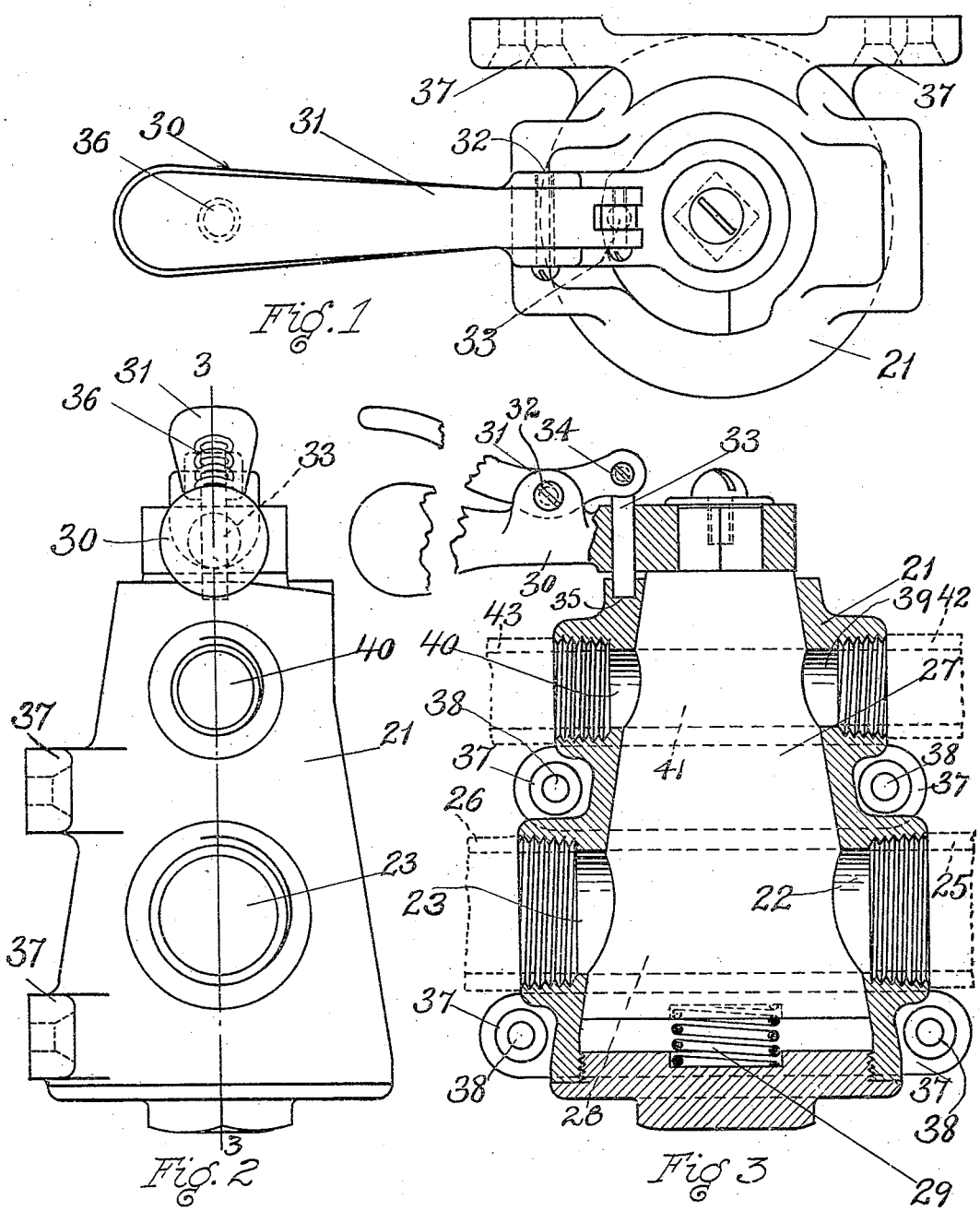

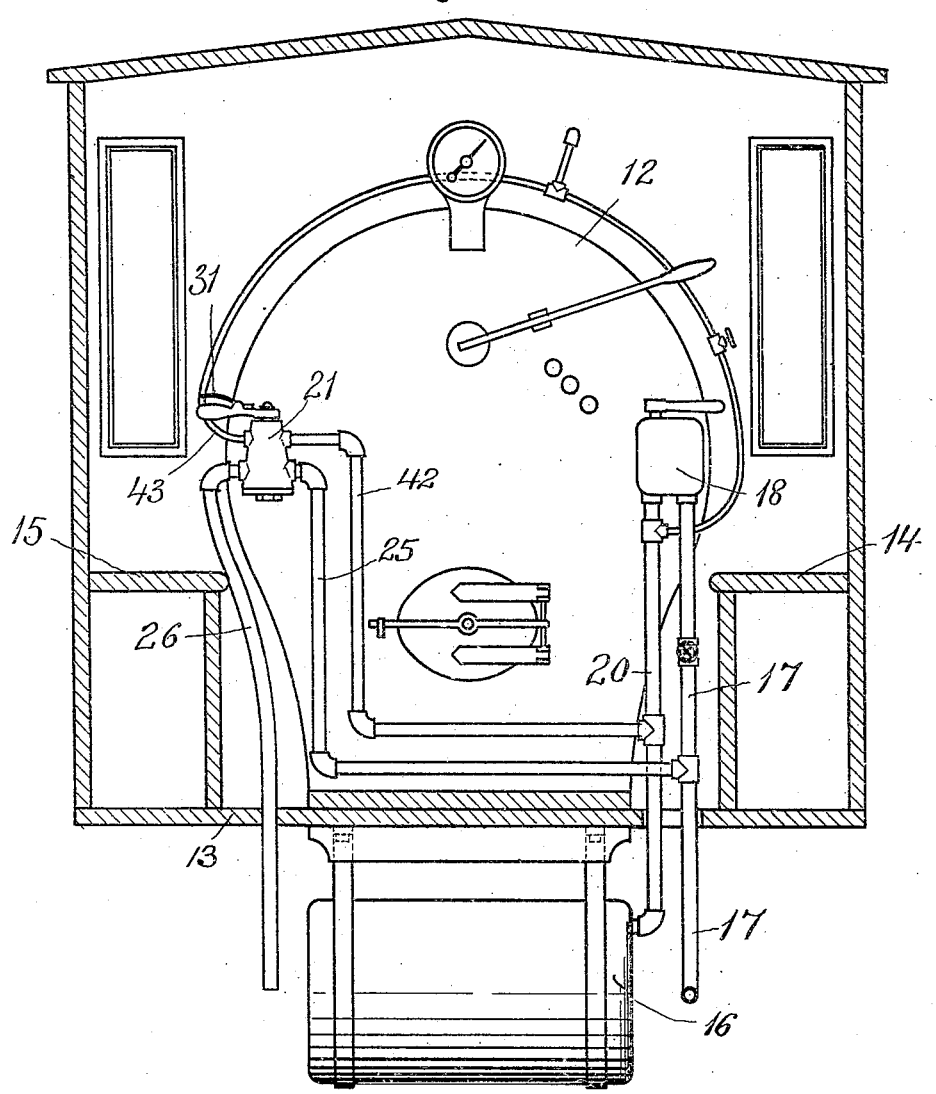

SAMUEL N. STEVENS, OF FITCHBURG, MASSACHUSETTS.

AIR-BRAKE-CONTROLLING MEANS FOR LOCOMOTIVE-ENGINES.

955,611.  Specification of Letters Patent.  Patented Apr. 19, 1910.

Application filed February 9, 1910.  Serial No. 542,968.

*To all whom it may concern:*

Be it known that I, SAMUEL N. STEVENS, of Fitchburg, in the county of Worcester and State of Massachusetts, have invented certain new and useful Improvements in Air-Brake-Controlling Means for Locomotive-Engines, of which the following is a specification.

This invention has for its object to enable the brakes of a railway train to be applied by the fireman of the locomotive while occupying his usual station at the left of the cab, so that in case the engineer is unable from any cause to operate the usual engineer's valve at the right of the cab, the brakes may be quickly applied by the fireman.

The invention is embodied in an emergency valve comprising a casing having means for attachment to a fixed support at the fireman's side of the cab, and inlet and outlet ports, the former connected by a branch air pipe with the usual train pipe of the air brake system, while the outlet port communicates with the atmosphere, and a valve plug movable in said casing and adapted to be moved by the fireman to connect the said inlet and outlet ports, and thus cause the application of the brakes throughout the system.

The invention is also embodied in an emergency valve characterized as above, and having an additional inlet and outlet port, the inlet port being connected with the air reservoir of the locomotive, and the outlet port being connected by an air delivery pipe with the track-sanding apparatus of the locomotive so that the adjustment of the air brakes to cause their application to the train also causes the application of sand to the track.

Of the accompanying drawings, forming a part of this specification,—Figure 1 represents a top plan view of an emergency valve constructed in accordance with my invention. Fig. 2 represents a side view of the same. Fig. 3 represents a section on line 3—3 of Fig. 2. Fig. 4 represents an elevation of the boiler head of a locomotive engine, and a transverse sectional view of the cab showing the emergency valve in place.

The same reference characters indicate the same parts in all the figures.

In the drawings,—12 represents the head of a locomotive boiler, and 13 represents the floor of the cab of the locomotive, the engineer's seat being shown at 14, and the fireman's seat at 15.

16 represents the air reservoir of the brake system applied to the locomotive as usual.

17 represents the train pipe of the air brake system, or the portion thereof which is carried by the locomotive, the entire train pipe including the usual sections affixed to the cars and couplings connecting said sections.

18 represents the casing of the engineer's brake-operating valve, said casing being located at the engineer's side of the cab and connected with the train pipe, and by a branch 20 with the air reservoir 16.

The construction thus far described is common and well known, and does not require description in detail, it being sufficient to state that the engineer applies and releases the brakes by operating the valve of which the casing 18 forms a part in the usual manner.

In carrying out my invention, I provide an emergency valve located at the fireman's side of the cab, and so connected with the brake system that the fireman is enabled by its use to apply the brakes while occupying his usual position in the cab. The said emergency valve includes a casing 21 having an inlet port 22 and an outlet port 23, said ports being in alinement with each other. The inlet port 22 is connected by a branch pipe 25 with the train pipe 17. The outlet port 23 communicates with the atmosphere preferably through a pipe 26 extending to the exterior of the cab, and preferably through the floor thereof, as shown in Fig. 4. The emergency valve also includes a valve plug 27 which is fitted to rotate in the casing 21 and has a transverse passage 28 which connects the ports 22 and 23 when the emergency valve is open, said ports being disconnected from each other by the valve plug when the emergency valve is closed. The valve plug and the seat which receives it are preferably of tapering form, as shown in Fig. 3, the valve plug being preferably yieldingly pressed against its seat by a spring 29. To one end of the valve plug is attached an operating handle 30 by which it may be adjusted, said handle being provided with means for locking it to the casing to secure the valve plug in its open position.

Said locking means include a lever 31 which is fulcrumed at 32 to the handle 30, and a locking bolt 33 connected at 34 with the shorter arm of the lever 31 and adapted to enter a socket 35 in the casing. A spring 36 (Fig. 2) exerts pressure on the lever in the direction required to force the bolt 33 into its socket.

The casing 21 is provided with attaching means whereby it may be secured to a fixed support at the fireman's side of the cab, said support being preferably the boiler head 12. Said attaching means, as here shown, include ears 37 formed on the casing and adapted to be seated on the boiler head, said ears having holes 38 for the reception of the attaching screws.

From the foregoing, it will be understood that when the emergency valve is open, air is permitted to pass from the train pipe 17 through the branch pipe 25, and escape into the atmosphere through the outlet pipe 26, this operation causing the application of the brakes.

The emergency valve is also preferably adapted to cause the operation of the track-sanding apparatus of the locomotive, and to this end, the casing 21 is provided with an additional air inlet port 39 and an additional air outlet port 40, the valve plug 27 being provided with a passage 41 adapted to connect the said ports 39 and 40 at the same time that the ports 22 and 23 are connected. The inlet port 39 is connected by a branch air inlet pipe 42 either directly with the air reservoir 16, or with the pipe 20 which connects said reservoir with the engineer's valve casing. To the outlet port 40 is connected an air-conducting pipe 43 which extends through the front of the cab and is suitably related to the track-sanding apparatus to cause a flow of sand on the track when the emergency valve is open.

It will be seen from the foregoing that my invention provides a very desirable means for increasing the safety of the traveling public, and preventing such accidents and loss of life and property as have been known to result from the sudden disability of the engineer. A locomotive cab equipped with my invention is provided with two separate means for applying the brakes, one under control of the engineer and the other under control of the fireman, so that the fireman is enabled to apply the brakes instantly in case of the absence or disability of the engineer.

My invention is particularly useful on single track railways where abrupt curves are frequent, so that the engineer is at times unable to have an unobstructed view of both sides of the track immediately ahead of the engine. At such times the view of the fireman is unobstructed at his side of the track, so that he can see objects which are concealed by the engine from the engineer. It sometimes happens that a flagman in signaling a train to stop, takes his stand so near an approaching engine that he cannot be seen by the engineer, but can be seen by the fireman. The emergency valve therefore enables the fireman to stop the train promptly on knowledge not possessed by the engineer. The provision of means for locking the emergency valve in an open position enables the fireman to know certainly that the valve has been properly operated, and prevents liability of an excessive movement of the valve plug.

I claim:

1. A locomotive having suitable air-brake-operating means, including an air reservoir, a train pipe, and an engineer's valve located at the engineer's side of the cab, and connected with the air reservoir and the train pipe, an emergency valve comprising, first, a casing having attaching means secured to a fixed support located at the fireman's side of the cab, and having also an inlet and an outlet port, the latter communicating with the atmosphere; and secondly, a valve plug movable in said casing and adapted to connect and disconnect said ports, and a branch pipe connecting said inlet port with the train pipe.

2. A locomotive having suitable air-brake-operating means including an air reservoir, a train pipe, and an engineer's valve located at the engineer's side of the cab, and connected with the air reservoir and the train pipe, an emergency valve comprising, first, a casing having attaching means secured to a fixed support located at the fireman's side of the cab, and having also two inlet ports and two corresponding outlet ports; and secondly, a valve plug movable in said casing and adapted to simultaneously connect and disconnect said ports, air supply pipes connecting the said inlet ports with the train pipe and the reservoir respectively, one of the outlet ports communicating with the atmosphere, and an air discharge pipe connected with the other outlet port, and extending to the track-sanding apparatus of the locomotive.

3. In a locomotive, an emergency valve comprising a casing having means for attachment to a fixed support at the fireman's side of the cab, and having an inlet port and a corresponding outlet port, the latter communicating with the atmosphere, and a valve plug movable in said casing and adapted to connect and disconnect said ports.

4. In a locomotive, an emergency valve comprising a casing having means for attachment to a fixed support at the fireman's side of the cab, and having an inlet port and a corresponding outlet port, the latter communicating with the atmosphere, a valve plug movable in said casing and adapted to connect and disconnect said ports, and means for locking said valve plug against movement in the casing.

5. In a locomotive, an emergency valve comprising a casing having means for attachment to a fixed support at the fireman's side of the cab, and having an inlet port and a corresponding outlet port, the latter communicating with the atmosphere, a valve plug movable in said casing and adapted to connect and disconnect said ports, said valve plug having an operating handle, a spring-pressed lever fulcrumed on said handle, and a locking bolt engaged with said lever and adapted to engage a socket in the casing.

6. An emergency valve comprising a casing having means for attachment to a fixed support in a locomotive cab, and having two inlet ports and two corresponding outlet ports, said ports being adapted to be engaged with air-conducting pipes, and a valve plug movable in said casing and having two passages adapted to simultaneously connect the said ports when the plug is moved to its open position.

7. A locomotive having suitable brake-operating means including an emergency valve located at the fireman's side of the cab, and suitable pipe connections between said valve and the usual air brake system, whereby the brakes may be applied by the opening of said valve.

8. A locomotive having suitable brake-operating means including an engineer's valve located at the engineer's side of the cab, an emergency valve located at the fireman's side of the cab, and suitable pipe connections whereby the brakes may be applied by the opening of either valve.

In testimony whereof I have affixed my signature, in presence of two witnesses.

SAMUEL N. STEVENS.

Witnesses:
 ALVAH M. LEVY,
 EARL H. FARWELL.